United States Patent [19]

Okubo

[11] 4,223,642
[45] Sep. 23, 1980

[54] METHOD FOR IMPROVING THE COMBUSTION EFFICIENCY OF HYDROCARBON FUEL IN THE INTERNAL COMBUSTION ENGINE

[76] Inventor: Yoshinori Okubo, 5-21, Kentoku-machi 1-chome, Oita-shi, Oita-ken, Japan

[21] Appl. No.: 856,431

[22] Filed: Dec. 1, 1977

[30] Foreign Application Priority Data

Dec. 15, 1976 [JP] Japan .................. 51/151420

[51] Int. Cl.³ .................. F02B 43/08; F02B 43/10
[52] U.S. Cl. .................. 123/1 A; 123/436; 123/3; 123/575 R; 422/148; 422/164
[58] Field of Search .................. 123/1 A, 3, DIG. 12, 123/119 E; 422/148, 164, 305; 423/356, 420

[56] References Cited
U.S. PATENT DOCUMENTS

| | | | |
|---|---|---|---|
| 1,490,975 | 4/1924 | Howard | 123/DIG. 12 |
| 2,140,254 | 12/1938 | Zavka | 123/119 E |
| 2,888,913 | 6/1959 | Emmett et al. | 123/119 E |
| 3,150,645 | 9/1964 | Mrstik et al. | 123/1 A |
| 3,174,472 | 3/1965 | Balogh | 123/119 E |
| 3,800,761 | 4/1974 | Sata | 123/1 A |
| 3,826,815 | 7/1974 | Mavrovic | 423/356 |
| 3,900,554 | 8/1975 | Lyon | 123/1 A |
| 3,985,107 | 10/1976 | Ueno et al. | 123/1 A |
| 4,067,299 | 1/1978 | Lindenmaier | 123/1 A |

*Primary Examiner*—Charles J. Myhre
*Assistant Examiner*—Craig R. Feinberg
*Attorney, Agent, or Firm*—Jordan and Hamburg

[57] ABSTRACT

A method which improves the combustion efficiency of fuel in the internal combustion engine is disclosed. The method is substantially characterized in that a small amount of ammonia gas is incorporated into the hydrocarbon fuel in any position between an air intake port and an intake manifold of the engine. Due to the above addition of ammonia, the combustion of the hydro-carbon fuel in the combustion chamber is enhanced with the improved composition of the discharged gas.

15 Claims, 9 Drawing Figures

METHOD FOR IMPROVING THE COMBUSTION EFFICIENCY OF HYDROCARBON FUEL IN THE INTERNAL COMBUSTION ENGINE

BACKGROUND OF THE INVENTION

This invention relates to a method for improving the combustion efficiency of gasoline fuel in the internal combustion engine mounted on an automobile, particularly to such a method which is characterized by adding ammonia gas, which can be produced from any desired ammonia compounds such as liquid ammonia or ammonium carbonate, to the gaseous or mist form of gasoline to be incorporated into the engine, whereby the combustion efficiency of the engine is enhanced while the amounts of pollutants contained in the discharged gas are minimized.

Conventionally, for decreasing the amount of pollutants contained in the gas discharged from the internal combustion engine, several methods have been developed and used on a trial basis including a group of methods which have treated the discharged gas after combustion and a group of methods which have added some additives to the hydrocarbon fuel prior to the combustion in the engine.

In the latter group of methods, although they have worked effectively in some particular conditions or cases, most of them have incurred a decrease in combustion efficiency.

As a fuel additive composition which can decrease the amount of pollutants in the discharged gas while keeping a high combustion efficiency, a composition which comprises a major amount of white oil, 1 to 4 percent by volume, based on the total volume of composition and about 0.02 to 0.1 percent by volume, based on the total volume of the composition of oil of orange is disclosed in U.S. Pat. No. 3,820,962 (patented on June 28, 1974).

Meanwhile, for obtaining the complete combustion of fuel in the internal combustion engine, methods which inject a reforming agent into the gasoline vapor have been developed wherein a method which injects the water vapor into the intake manifold of the internal combustion engine or a method which injects the alcohols, the mixture of water and alcohol, or the mixture of water, alcohol, propylene and acetone have been well known. It is believed that the addition of water vapor or alcohol enhances combustion and produces a discharged gas of favorable composition.

Although alcohol which contains oxygen facilitates the complete combustion as has been described above, lower alcohol such as methanol requires a delicate technique in mounting the supply device thereof and causes the methanol residue by thermal decomposition which is troublesome in disposal. Furthermore, the alcohol does not have compatibility with hydrocarbon.

Meanwhile, the oxygen-containing alcohol has a tendency to produce nitrogen oxide at high temperatures of more than 1200° C. while it causes incomplete combustion at low temperatures. Accordingly, in the above method a compound is employed besides alcohol for providing complete combustion without producing nitrogen oxide. Also, started from the same technical idea is a method which adds acetate, a mixture of acetate and alcohol, or a mixture of the above components with water into the fuel before combustion. In the above method, when the fuel is in a gaseous form, the above additive is incorporated into the fuel in a mist form prior to the mixture of fuel and air. When the fuel is in a liquid form, the additive is dissolved in the fuel beforehand (Japanese patent laid open publication SH049-44006).

The methods discussed above have employed the compound composed of hydrocarbon and oxygen for obtaining complete combustion of hydrocarbon fuel.

Meanwhile, a method which uses a compound containing nitrogen as a fuel additive is known. When the operators of racing cars want extra performance for limited periods of time, they add 5 percent nitromethane to the methanol in the fuel tank. It has also been reported that combustion is increased by mixing gasoline, benzene and methanol. In conjunction with the above method, U.S. Pat. No. 3,807,972 (granted on Apr. 30, 1974) discloses a method for improving the combustion efficiency wherein the mixture consisting of 75 percent methanol, 5 percent nitro-methane, 2 percent nitro-benzene and 18 percent acetone is mixed with water and the thus produced mixture is vaporized. Subsequently the vaporized mixture is injected into the intake manifold of the internal combustion engine, whereby the combustion performance of the engine is enhanced while the composition of the discharged gas is improved.

The inventor of this invention also has continued a study on the method for enhancing the combustion efficiency of the fuel in the internal combustion engine and has unexpectedly found that when the ammonia gas, produced from a compound which can produce such ammonia gas, is mixed with the intake air and subsequently is slightly mixed with the gaseous or mist form of gasoline to be charged into the internal combustion engine, the output of the engine is greatly enhanced resulting in a reduced consumption of fuel.

The applicant also has found that addition of such mixture into the fuel can improve the combustion efficient without substantially increasing the adverse nitrogen oxide content within the discharged gas.

Accordingly, it is an object of the present invention to provide a method for improving the combustion efficiency of hydrocarbon fuel within the combustion chamber of the internal combustion engine which is characterized by the addition of ammonia gas or a volatile ammonium compound to the gaseous or mist form of gasoline in the fuel stream of the internal combustion engine.

It is another object of the present invention to provide such a method for improving the combustion efficiency while decreasing the amount of pollutants within the discharged gas.

It is a further object of the present invention to provide a device applicable to the method of this invention which can continuously add the ammonia gas produced from ammonium compound to the hydrocarbon fuel in the internal combustion engine.

It is a still further object of the present invention to provide such a device which is of a simple and yet rigid construction so that it can be easily installed in an automobile of any desired type.

These and other objects of the invention will be seen by reference to the following description, taken in connection with the accompanying drawings.

DETAILED DESCRIPTION OF THE DISCLOSURE

The internal combustion engine to which the present invention is applicable includes all types of internal combustion engines which use hydrocarbon as a fuel, particularly the engines of automobiles, trucks, tractors and airplanes.

As fuels whose combustion efficiency will be improved by the application of the method of this invention, any internal combustion engine fuels which are ignited by an electric spark can be considered. Such fuels include commercially available petroleum distillates such as automobile gasoline having the fraction of distillate of 20° to 30° centigrade or airplane gasoline having the fraction of distillate of 35° to 165° centigrade.

Furthermore, if conditions will be satisfied, the method of this invention may be applicable to a diesel engine which uses diesel oil.

It is needless to say that the method of this invention can employ conventional additives of various purposes such as an anti-erosion agent, anti-static agent, anti-oxidation agent, anti-freezing agent or anti-knocking agent together with the additive of this invention.

As compounds which can produce the gaseous compound applicable to the method of this invention, ammonium carbonate, ammonium bicarbonate and ammonium carbamate can be mentioned. Liquid ammonia may be contained in cylinders. The ammonia water may preferably contain 20 to 30 percent by weight of ammonia.

The ammonium carbonate and ammonium bicarbonate are obtained commercially in solid form wherein the ammonium carbonate exists in the form of a mixture or double salt of ammonium hydrogencarbonate ($NH_4HCO_3$) and ammonium carbamate ($H_2NCO_2NH_4$). The ammonium carbonate is decomposed in the air into ammonia, carbon dioxide and water and eventually is decomposed into bicarbonate and ammonia. This decomposition proceeds in the air even at room temperature while generating a quantity of heat. When the temperature reaches 58° C. the decomposition rapidly progresses. Furthermore, the ammonium carbonate is sublimated by the above heat quantity into the gaseous form.

Ammonium bicarbonate ($NH_4HCO_3$) is also decomposed in the air into ammonia and carbon dioxide. The decomposition progresses together with the elevation of temperature and when the temperature exceeds more than 60° C. the decomposition rapidly proceeds and ammonium bicarbonate is sublimated into the gaseous form.

Ammonium carbamate is decomposed in the same manner as that of ammonium carbonate and ammonium bicarbonate.

In the method of this invention, an additive such as ammonia or a volatile ammonia compound is employed in the following manner.

In the case of a solid ammonia compound, since the compound gradually decomposes and produces ammonia gas, it is preferable to use this compound in the method of this invention. Furthermore, a solid ammonia compound requires no specific safety measures which are necessary in liquid ammonium.

However, since the decomposition rate of a solid ammonia compound varies to some extent depending on the temperature, the container in which the gas is produced should preferably be held at a constant temperature so as to supply a constant amount of ammonia gas into a fuel such as gasoline.

A device which is applicable to the method of this invention is hereinafter described wherein the device supplies the ammonia gas produced from solid ammonium carbonate into the intake air within the air cleaner.

Solid ammonium carbonate is contained within a container which comprises a lid portion 3 and a cylindrical container body 2. A vertical flow-out passage 4 through which ammonia gas sublimated from solid ammonium carbonate flows out is provided at the lid portion 3. The upper end of the passage 4 is joined to a middle portion of a horizontal passage 5 forming a T-shaped communicating chamber within a three-way joint member 6. For increasing the amount of ammonia gas from the container, a venturi construction may be provided on the three-way joint member 6.

A flow regulating valve 8 is attached to the bottom end of a vertical vinyl tube 7 of a desired length which, in turn, has the upper end thereof connected with the vertical portion of the joint member 6. This flow regulating valve 8 has its lower opening within the container 2.

The horizontal both-open-ended passage 5 of the three-way joint member 6 has one end thereof communicated with an oncoming air flow by way of a heat resistant silicon pipe 9. This silicon pipe 9 is provided with a flow regulating valve 10 for regulating the air flow into the horizontal flow passage 5.

The horizontal passage 5 has another end communicated by way of a heat-resistant tube 12 with a circular vinyl tube 15 which substantially encloses an air filter 14 within an air cleaner 13. The above heat-resistant tube 12 is provided with a flow regulating valve 11 in the midst thereof.

A plurality of openings 16 are equidistantly formed on the periphery of the circular vinyl tube 15 such that the ammonia gas passing through the heat resistant tube 12 can enter into the air cleaner 13.

Referring back to the container, an air introduction pipe 17 which introduces the air (pressure) into the container is also provided at the lid portion. This air introduction pipe 17 is both-open-ended having one end open to an on coming air flow and another end open to the inside of the container body 2. A flow regulating valve 18 is provided at the outside extremity of the pipe 17. A casing 19 which solidly encases the container 2 is provided with a rotating lid 20 on the upper portion thereof such that the lid 20 is rotatable relative to the casing 19. A mounting plate 21 facilitates the mounting of the casing 19 to any desired position adjacent to the internal combustion engine of an automobile.

An air inlet 22 supplies sufficient air into the air cleaner 13 while a communicating tube 24 connects the air cleaner 13 with a carburetor 23.

The casing 19 which encases the ammonium carbonate container is fixedly placed at a desired airy position in the front portion of the automobile by means of the mounting plate 21. Such a placement is inevitably necessary so that the entire device used for the method of this invention can be protected from high radiation heat generated by the engine.

It is also necessary that the openings of the tubes which open to the atmosphere are directed in alignment with the moving direction of the automobile.

At the same time, the other end of the tube is connected to the circular vinyl pipe 15 disposed within the air cleaner 13.

After the above mounting operation, the engine of the automobile is started.

Throughout the running of the automobile, the regulated air flows into the container 2 through the flow regulating valve 18 and air introduction pipe 17. Thus charged air increases the air pressure within the container 2 in proportion to the running speed of the automobile and the ventilation within the powder-like ammonia is promoted whereby the sublimation of the ammonia into the ammonia gas is also enhanced. Namely, this invention utilizes a phenomenon that the ammonium carbonate which, in general, is an ustable compound tends to turn into the ammonium bicarbonate while producing the ammonia gas.

When the ammonia gas, which is produced in the above manner, fills the container 2, the gas flows out through the flow regulating pipe 8 and flow passage 4 due to the air pressure from the flow regulating valve 10 attached to one open end of the horizontal flow passage 4 and the intake air pressure of the air cleaner 13. Subsequently, the ammonia gas flows in an arrow direction within the horizontal passage 5 and reaches the circular vinyl pipe 15 within the air cleaner 13 by way of the flow regulating valve 11 and the heat-resistant silicon pipe 12. It eventually flows into the air cleaner 13 through the ammonia gas outlet openings 16. Thus flow-in ammonia gas passes through the filter 14 and is incorporated into the internal combustion engine by way of the communicating tube 24 and the carburetor 23 along with the filtered clean air as well as with hydrocarbon fuel in a gaseous form.

In the above process, the flow regulating pipes 8, 10, 11 and 18 are adjusted such that the mixing ratio of ammonia gas relative to the gaseous fuel falls within the range of 30–140 mg/l. Due to the combustibility of the ammonia gas, the combustion speed of the air-fuel mixture is promoted.

The following modifications can be considered on the device of this invention.

Figure 1:
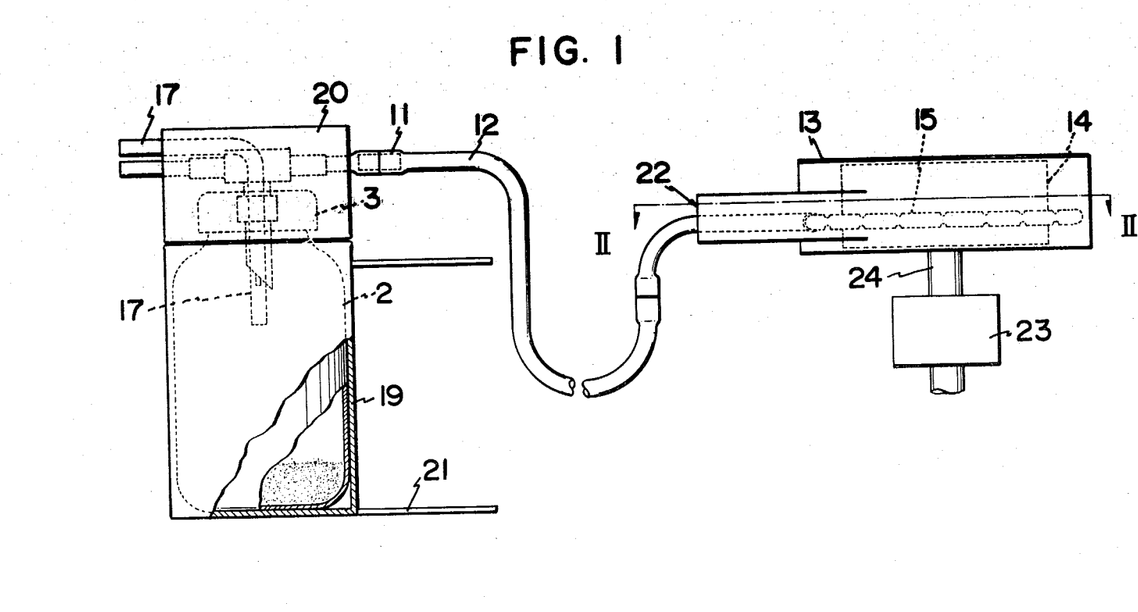
FIG. 1 is an entire front view of the device employed for the method of this invention.
Figure 2:
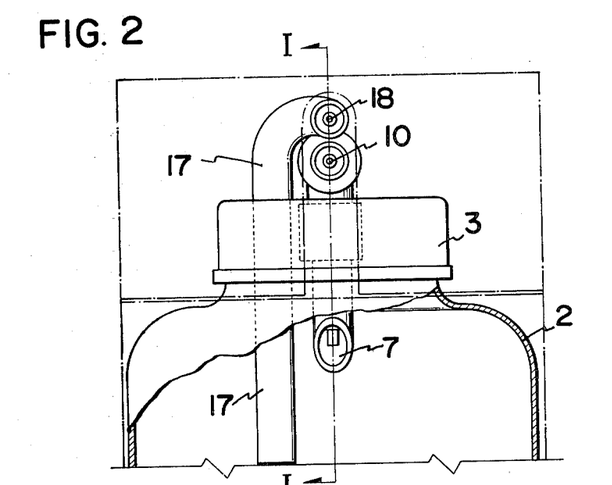
FIG. 2 is an enlarged partial left side view of the device with a part broken away showing the upper portion of the container.
Figure 3:
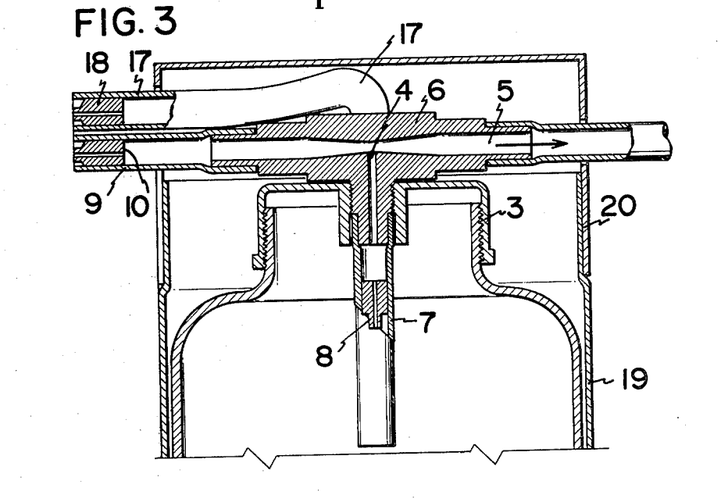
FIG. 3 is a longitudinal cross-sectional front view of the device taken along the line I—I of FIG. 2.
Figure 4:
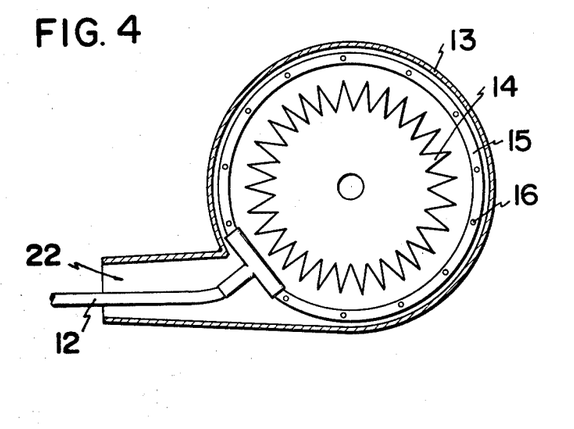
FIG. 4 is a transverse cross-sectional plan view of the device taken along the line II—II of FIG. 1.
Figure 5:
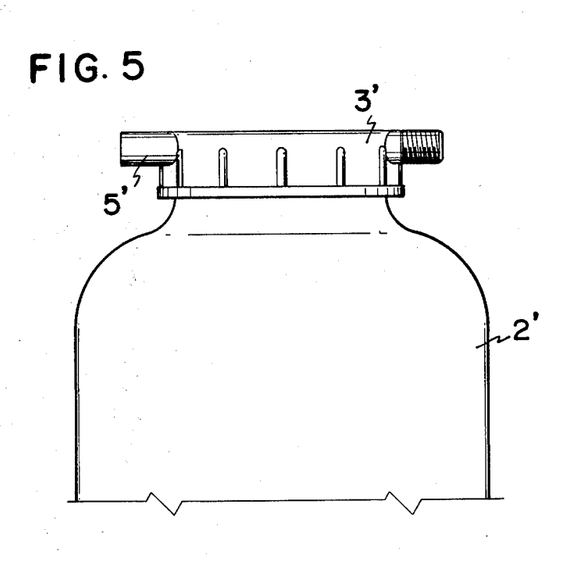
FIG. 5 is a front view of a modification of the device of this invention.
Figures 6, 6A:
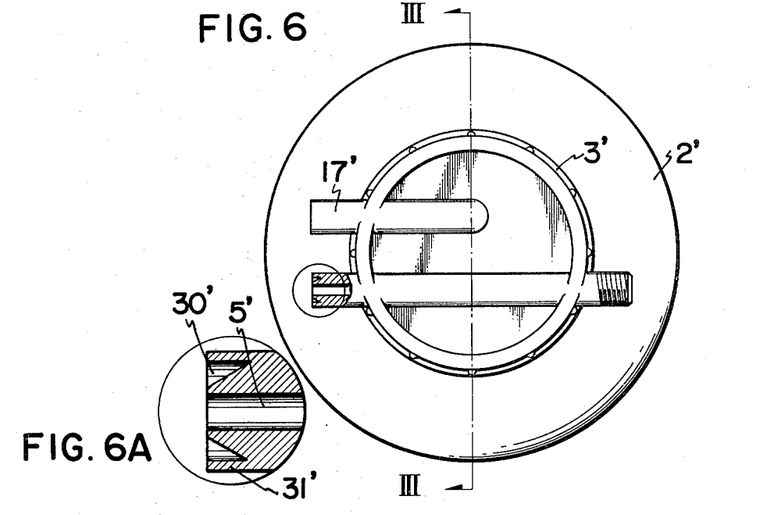
FIG. 6 is a plan view of the above device.
FIG. 6A is an enlarged view of the portion of FIG. 6 enclosed within the circle shown in FIG. 6.
Figure 7:
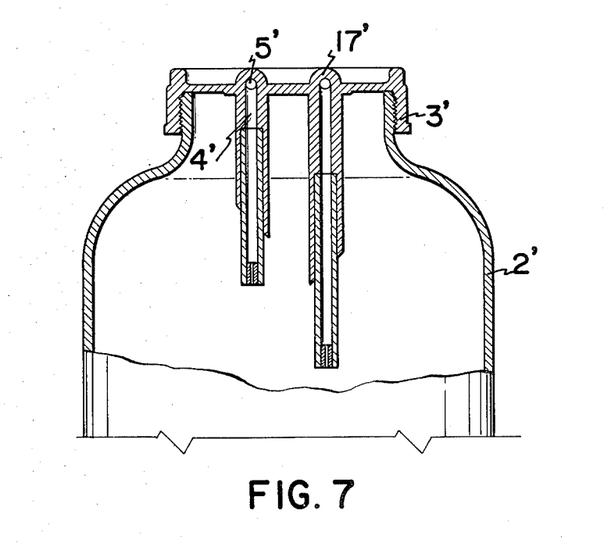
FIG. 7 is a longitudinal cross-sectional view of the device taken along the line III—III of FIG. 6.

As shown in FIG. 5 to FIG. 7, the first modification is characterized in that a horizontal flow passage 5', a vertical flow-out passage 4' and an air introduction pipe 17' are integrally formed in a lid portion 3' of a container 2'. In the above construction, no flow-regulating valves 10 and 18 of the previous embodiment are employed. Instead, the front end of the heat-resistant pipe 9 and that of the air introduction pipe 17 are constructed as shown in FIG. 7. Namely, such end comprises a frust-conical portion 30' and a circular peripheral wall 31' extending from the bottom periphery of the frust-conical portion 30.

The air flow passages 4' and 5' formed in the lid portion 3' respectively may preferably have a diameter ranging from 1.0 mm to 1.6 mm which corresponds to the diameter of the flow regulating valves 10 and 18 of the original construction.

Figure 8:
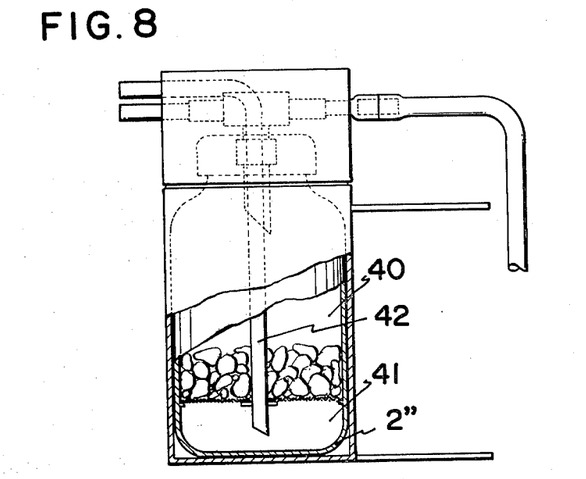
FIG. 8 is a front view with a part broken away of another modification of the device of this invention.

The second modification of the device is characterized in that an air (pressure) is introduced into an air chamber formed below a solid ammonium compound in a container as shown in FIG. 8.

In FIG. 8, a container 2" is divided into an upper ammonium compound chamber 40 and a lower air chamber 41 by a net screen of a desired mesh. In the upper chamber 40, a bulky solid ammonium compound is contained. An air introduction pipe 42 which has one end open to an oncoming air flow has another end open in the lower air chamber 41. Due to the above construction, the production of ammonia gas might be enchanced.

For determining the desired amount of ammonia gas to be incorporated into the gasoline mist, a test was conducted wherein the ammonium carbonate was first filled in the device shown in FIG. 1 to FIG. 4. As a result of the test, we have found that when the ammonium carbonate in the container decreased at a rate of 110 mg to 500 mg per a liter of gasoline, the fuel consumption ratio was noticeably increased.

If we calculate the preferred amount of ammonia gas to be mixed into the gasoline mist on the assumption that the decomposition of the above ammonium carbonate at the beginning produces the ammonia gas and carbon oxide, it should be in a range from 30.6 mg to 139 mg per a liter of gasoline expressed as $NH_3$.

Therefore, the amount of air to be incorporated into the device must be regulated such that the above preferred amount of ammonia gas be added to the gasoline mist.

The ammonia gas of such a small amount is incorporated into the gasoline mist at any suitable location of a fuel stream leading to the intake manifold of the internal combustion engine.

The results of the test on fuel consumption rate are shown in Table 1.

The experiment was conducted with the following particulars by the applicant himself.

| | |
|---|---|
| (1) Automobile used for test: | Honda New Life, K4, 360c.c. |
| (2) Test period: | From April 8, 1976 to October 15, 1976 |
| (3) Travelled distance: | 15086km |

TABLE 1

| | Fuel consumption ratio (Km/l)* | |
|---|---|---|
| Driving | Device Not mounted | Device Mounted |
| City driving | about 12–13 | about 16–18 |
| Highway driving | about 15–16 | about 21–26 |

*1 liter

The results of the tests conducted by a third person are further shown in Table 2. In those tests, a Honda Civic 1500 c.c. was used.

TABLE 2

| Measured items | Measuring conditions | |
|---|---|---|
| | Device Not mounted | Device Mounted |
| Travelled distance (Km) | 215.0 | 216.0 |
| Fuel consumption (1) | 26.0 | 21.9 |
| Fuel consumption ratio (Km/l) | 8.26 | 10.13 |
| CO (%) | 0.2 | 0.2 |
| HC (ppm) | 30 | 30 |

The result of another experiment conducted with SA Honda Life 360 c.c. is shown in Table 3, although the travalled distances were rather short.

TABLE 3

| Measured items | Measuring conditions | | |
|---|---|---|---|
| | Device Not mounted | Device Mounted | Device Mounted |
| Travelled distance (Km) | 1.7 | 1.7 | 6.4 |
| Fuel consumption (1) | 0.109 | 0.102 | 0.287 |
| Fuel consumption ratio (Km/l) | 15.59 | 16.66 | 22.29 |
| CO (%) | 1.4 | 1.6 | 1.2 |
| HC (ppm) | 310 | 250 | 100 |

As shown in the above tables, the reduction of the fuel consumption rate is clearly observed with the automobile provided with the device of this invention.

However, in the method of this invention, the analysis test of the discharged gas is difficult to conduct when the car is travelling. Therefore, we have conducted tests under non-load (neutral position) driving conditions and have detected HC content, NOx content and CO content of the discharged gas before and after the mounting of the device of this invention. The results of the tests are described hereinafter.

TEST ON HC (HYDROCARBON)

Non-loaded Condition

Automobile used in the test
(1) Toyota Celica GT, year—1975, 5 speed, type of engine 2 T
(2) Bluebird U 35, year—1975, type of engine—L-16
(3) Skyline 1600 GL, year—1975
Measuring instrument used in the test
Shimazu Seisakusho, Hydro-carbon meter HCM-1A with full automatic recorder
Manner of test Under the non-load (neutral position) condition, the revolution of the engine shaft is kept at a constant level by regulating the accelerator padal. The revolution was chosen at four levels in the range of 1000 to 3000 r.p.m. This revolution range approximately corresponds to the range the automobile takes in practical travelling or driving. No wind was supplied to the front portion of the automobile.

The container of the device was warmed so as to promote or enhance the supply of ammonia gas into the engine. The amount of ammonia gas charged could not be measured, however.

Concentration of Hydrocarbon

TABLE 4

| Revolution (r.p.m.) | 1000 | 1500 | 2000 | 3000 |
|---|---|---|---|---|
| Equivalent Speed (Top driving) (Km/h) | about 30 | about 40 | about 55 | about 80 |
| Measured value (ppm) | | | | |
| (a) device not mounted | 990 | 345 | 600 | 830 |
| (b) device mounted | 910 | 270 | 270 | 800 |
| Difference (ppm) | | | | |
| (b) − (a) | −80 | −75 | −330 | −30 |
| Reduction Rate (%) | 8 | 22 | 55 | 4 |

TABLE 5

| Measurement at idling condition | Measured Value | |
|---|---|---|
| | Device not mounted | Device Mounted |
| Bluebird U35 | 1575 ppm (1100 r.p.m.) | 1540 ppm (1100 r.p.m.) |
| Skyline 1600 GL | 5050 (680 r.p.m.) | 3200 (800 r.p.m.) |

Upon reviewing the above results, it was found that when the device of this invention is attached, HC content greatly has reduced at the rovolution of about 1500 to 2500 r.p.m. (equivalent to 40 to 70 km/h at top driving) under the non-load condition.

For affirming the above fact, a load (weight) was applied to the automobile and the automobile was driven at a constant speed. A super combi-tester was used for measuring the speed of the automobile. Furthermore, the wind having the velocity equivalent to the practical driving speed of the automobile, was directly blown against the front of the automobile. Under the above condition, the concentration of hydrocarbon (HC) was measured before and after the attachment of the device of this invention. The load carried by the automobile, a weight of 110 kg, was uniformly distributed over the driver's and front passenger's seat.

Loaded Condition

Automobile used in the test
Mitsubishi Gallant SL, 1600 c.c., year—1973, engine 4G32, reading of odometer—38,000 km.
Measuring instrument used in the test
(1) Driving frame (speedometer)—NISSALOD Super combi-tester
(2) Hydrocarbon meter—Shimazu HCM-1A hydrocarbon meter with full automatic recorder, span gass $CH_4$ 8.68 ppm
(3) Blower—Koken Co., Ltd. Sakai-type pour-operated blower 101 type
(4) Anemometer—Ota Keiki Seisakusho Co., Ltd, Zeram-type anemometer Results of the above test are shown in the following Tables.

TABLE 6

| | Driving Speed | | | |
|---|---|---|---|---|
| Predetermined speed (Km/h) | The Velocity of Speedometer (Km/h) | Revolution (r.p.m.) | Gear | Wind Speed (m/sec) |
| 20 | 19–21 | 1200 | Third | 5.8 |
| 40 | 38–43 | 1500 | Fifth | 11.0 |
| 55 | 52–57 | 2000 | Fifth | 15.0 |
| 65 | | 2350 | Fifth | 16.0 |

TABLE 7

| Velocity (Km/l) | Device not Mounted | | | Device Mounted | | | Difference (b) − (a) (ppm) | Reduction Time (%) |
|---|---|---|---|---|---|---|---|---|
| | Measured Time (min.) | Measured HC Value (ppm) | Mean HC Value (ppm) | Measured Time (min.) | Measured HC Value (ppm) | Mean HC Value (ppm) | | |
| 20 | 39 | 415–375 | 395 | 16 | 330–314 | 322 | −73 | 18 |
| 40 | 28 | 515–530 | 523 | 12 | 355–368 | 362 | −161 | 30 |
| 55 | 22 | 800–776 | 788 | 14 | 444–440 | 442 | −346 | 44 |
| 65 | | | | 17 | 485–480 | 483 | | |

Upon reviewing the above results, it is clearly found that HC content decreased with the attachment of the device and that the reduction rate increased corresponding to the increase of travelling speed.

Besides the above tests, the applicant also conducted tests on NOx content of the discharged gas under both non-load and loaded conditions respectively using a BECKMAN-TOSHIBA model 951A No/NOx Analyzer. No noticeable difference was found in NOx content before or after the attachment of the device.

Furthermore, the applicant measured CO content of the discharged gas under non-loaded condition using Orsat apparatus. No noticeable difference was also found in CO before or after the attachment of the device.

Based on the above results of the tests, namely (1) HC content within the discharged gas is greatly reduced, (2) the very small amount of ammonia gas is added to the hydrocarbon fuel, and (3) no noticeable change is found in NOx content, it is considered that the ammonia gas plays a catalytic action for the combustion of hydrocarbon fuel in the combustion chamber of the internal combustion engine.

Accordingly, it has been found that the method and apparatus of the present invention enhance the combustion efficiency of the hydrocarbon fuel in the internal combustion resulting in the reduction of the fuel consumption rate.

It is also found that HC content in the discharged gas decreased due to the method and apparatus of this invention while no noticeable change of CO content in the discharged gas was found.

Furthermore, it is another advantage of the method of this invention that tar-like deposits which tend to occur on spark plugs, the intake manifold's inner wall, or the intake valve of the engine are not produced in the internal combustion engine. This implies that the method of this invention provides uniform distribution of fuel within the internal combustion engine.

What we claim is:

1. A device for improving the combustion efficiency of hydrocarbon fuel in an internal combustion engine of a motor vehicle comprising:

an airtight container containing a solid ammonium compound which is capable of producing ammonia gas, an ammonia gas flow-out passage having one end disposed in said container for conducting ammonia gas from said container, a conducting flow passage having an intermediate portion communicating with said ammonia gas flow-out passage, said conducting flow passage having its downstream end connected with a fuel stream of said internal combustion engine by means of a heat-resistant tube, said heat-resistant tube has one end joined to a circular tube which has a plurality of equidistant openings open to the inside of an air cleaner of said internal combustion engine, said conducting flow passage having its upstream end open to atmosphere to receive on-coming air as the motor vehicle moves forwardly, an air introduction conduit leading to said container, said air introduction conduit having its upstream end open to atmosphere to receive on-coming air as the motor vehicle moves forwardly, whereby the air in said air introduction conduit flows to said container to increase the air pressure within said container in proportion to the forward moving speed of the motor vehicle resulting in air movement within the container promoting the production of ammonia gas from said solid ammonium compound, and venturi means at said intermediate portion of said conduction flow passage, said venturi means receiving said on-coming flow of air to induce flow of ammonia gas from said container into said conducting flow passage and thence to said fuel stream.

2. Device for improving the combustion efficiency of hydrocarbon fuel in an internal combustion engine of a motor vehicle, comprising;

(a) a container of an air tight construction containing a desired amount of solid ammonium compound which is capable of producing ammonia gas, (b) a flow-out passage having one end disposed in said container and the other end disposed outside of said container for passing ammonia gas from said container, (c) a conducting flow passage having the middle portion thereof communicating with said other end of said flow-out passage, said conducting flow passage having one end open to the atmosphere to receive on-coming natural air flow as the motor vehicle moves forwardly and the other end communicating with a fuel stream leading to said engine by means of a heat-resistant tube, said heat-resistant tube has one end joined to a circular tube which has a plurality of equidistant openings open to the inside of an air cleaner of said internal combustion engine, and (d) an air introduction pipe having one end disposed in said container and the other end open to the atmosphere to receive natural air flow as the motor vehicle moves forwardly such that the natural air introduced into said air introduction pipe flows to said container in proportion to the forward speed of the motor vehicle to flow about said solid ammonia compound in said container and produce ammonia gas, whereby ammonia gas produced in said container from said solid ammonium compound is conducted from said container through said flow-out passage and thence through said conducting flow passage to said fuel stream to be added to said hydrocarbon fuel.

3. Device according to claim 2, wherein said container has a lid portion, said conducting flow passage and said flow-out passage being integrally formed with said lid portion of said container.

4. Device according to claim 2, wherein the inner diameter of said horizontal flow passage is 1.0 to 1.6 mm.

5. Device according to claim 2, wherein said container further includes a transverse permeable screen which separates said container into an upper ammonia containing chamber and a lower air introduction chamber and said air introduction pipe has one end thereof open to said lower air chamber.

6. Device according to claim 2, wherein said conducting flow passage is provided with a flow regulating valve downstream of said middle portion.

7. Device according to claim 2, wherein said flow-out passage is generally vertically disposed.

8. Device according to claim 2, wherein said conducting flow passage is generally horizontally disposed.

9. Device according to claim 2, wherein said conducting flow passage is provided with a venturi construction at said middle portion thereof.

10. Device according to claim 9, wherein said flow-out passage is provided with a flow regulating valve at the inlet end portion thereof.

11. Device according to claims 2 or 9, wherein said middle portion of said conducting flow passage and said other end of said flow-out passage are formed as a T-shaped joint member.

12. Device according to claim 11, wherein said container has a lid portion, said joint member being attached to said lid portion of said container.

13. Device according to claim 2, wherein said conducting flow passage is provided with a flow regulating valve upstream of said middle portion.

14. Device according to claim 2, wherein said air introduction pipe is provided with a flow regulating valve.

15. Device according to any of claims 13, 10 or 14, wherein the inner diameter of said flow regulating valve is 1.0 to 1.6 mm.

* * * * *